United States Patent Office 2,907,994
Patented Oct. 6, 1959

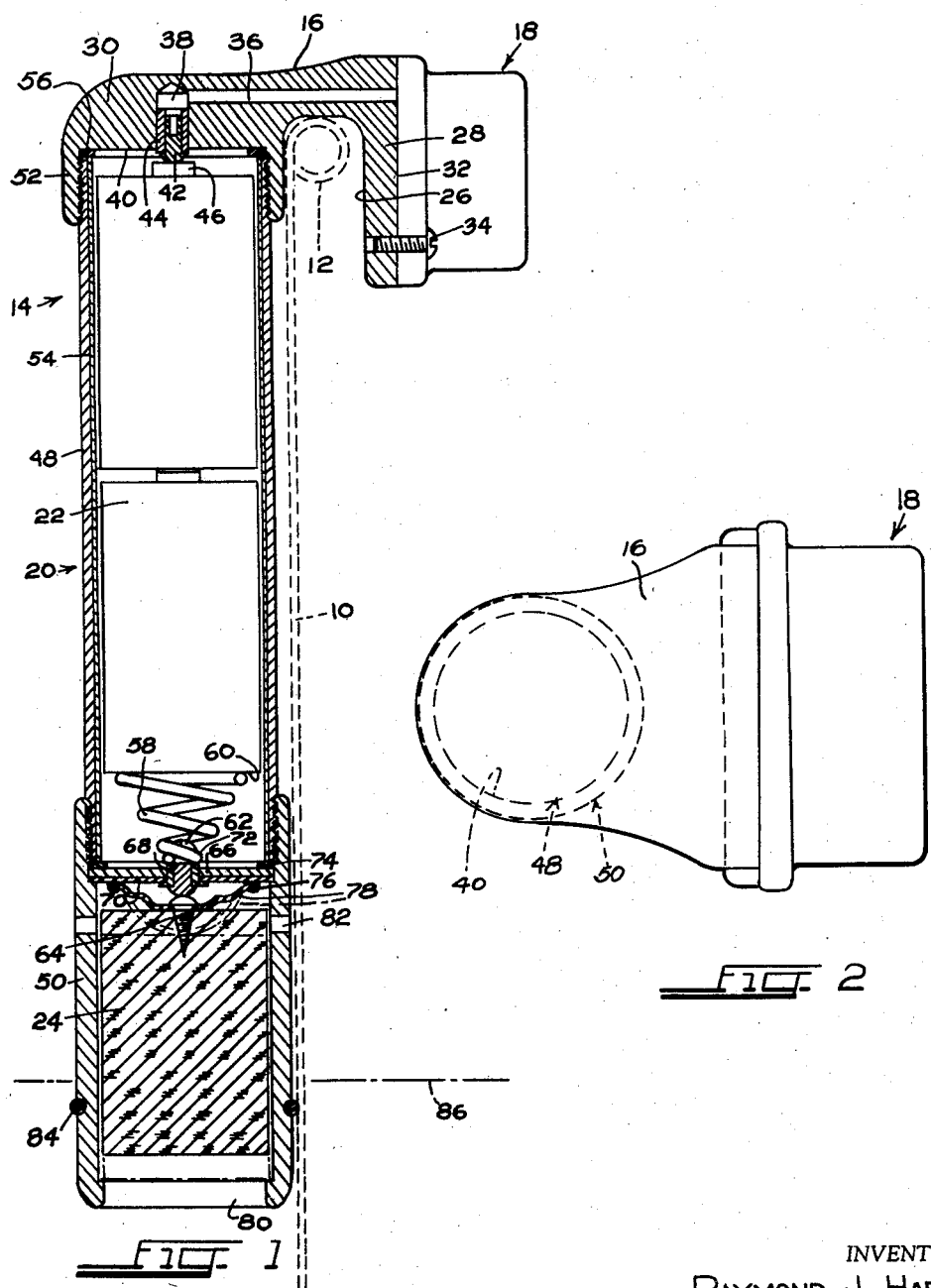

2,907,994

LIQUID LEVEL SIGNALING DEVICE

Raymond J. Harke, Chicago, Ill.

Application December 31, 1956, Serial No. 631,814

1 Claim. (Cl. 340—245)

The present invention relates to a liquid level signaling device and is adapted especially for placement on the edge of a tank for indicating when the level of liquid rises to a predetermined height in that tank.

The invention finds particular use, for example, in the practice of hydra-therapy, although it is of course not limited thereto. In the practice of hydra-therapy the attendant such as a doctor or nurse must set up certain equipment, one item of which is a tank which must be filled to the desired level immediately before use, i.e., it must be prepared for use at the time that other items of equipment are being prepared. In so preparing the various items of equipment for use, the attendant is not able to continuously watch the tank to shut off the supply of water when the level therein reaches a predetermined height; accordingly it is desired to provide for a signaling device to indicate when that occurs. It is preferable that an audible signal be provided so that the attendant may put his full attention to other matters and when the liquid in the tank does rise to the level indicated, the audible signal will indicate that the supply of water to the tank should be shut off.

It is further desired that such signaling device be as convenient as possible to handle and to place on the tank and further that it be easily detached or lifted off of the tank when the liquid level reaches the desired height and the treatment operation is to be performed. The equipment used in the treatment operation should, of course, be as free of extraneous matters as possible.

In accordance with the foregoing considerations, the device in the present invention is a small and compact device that can be easily placed on the hydra-therapy tank in the filling operation and after the signal has been given, it can be removed from the tank by a simple operation of grasping it by the hand and lifting it from the tank. The tank is then ready for use in the treatment operation proposed without hindrance from extraneous devices.

An object of the invention is to provide a novel device of the foregoing general character that is of extremely simple character.

Another object is to provide a device of the foregoing character having an audible signal means operated by an electric battery such as a flashlight battery and switching means for the battery that is actuated by a float which in turn is moved by the liquid in the tank, wherein novel housing means is provided for containing the battery and the float and sealing the battery against the entrance of liquid from the tank thereto.

Still another object is to provide a device of the foregoing general character which on its exterior is a completely enclosed, rigid and self-contained housing without any moving parts, and in which all moving and movable parts such as the float indicated above, are contained entirely within such housing.

Another object is to provide a device of the above noted character which is of extremely simple design and can easily be placed on the rim of the tank by the mere step of setting the device thereon, and removed by the equally simple movement of merely lifting it off the tank.

A further object is to provide a device of the foregoing general character having a novel kind of head bracket and housing detachably mounted therein, in which the head bracket is provided with a recess for receiving the rim of the tank for supporting the device thereon, and the housing extends from the head bracket down into the tank where a control float therein is subjected to the liquid in the tank.

Still another object of the invention is to provide a device of the character noted above having audible signal means such as a buzzer operated by an electric battery, and having a float subjected to the liquid in the tank for actuating switch means for controlling the battery, in which the switch means includes one switch element mounted on and carried by the float into and out of engagement with another switch element.

Other objects and advantages of the invention will be apparent from the following detail description taken in conjunction with the accompanying drawings in which:

Figure 1 is a vertical sectional view through the alarm device of the invention; and Figure 2 is a top view.

Referring in detail to the drawings, the liquid level signaling device of the invention is shown in its entirety in Fig. 1 where it is illustrated as applied to a tank 10 which may be of any suitable kind adapted for the purpose of hydra-therapy, as indicated above. The tank has an open top and a rim 12 over which the device is fitted.

The signaling device is indicated in its entirety by the numeral 14 and includes as its main parts, a head bracket 16 on which is mounted an audible sounding means 18, a housing 20, electric battery 22 such as a flashlight battery and a float 24. Stated broadly, the device is fitted on the tank 10 as illustrated and when the liquid level reaches the desired and predetermined height the float 24 rises and actuates switch means for closing the circuit between the battery 22 and the sounding means or alarm means 18. Upon this event occurring, the attendant merely grasps the device by the head bracket 16 and lifts it from the tank, whereupon the float 24 drops and the switch means is opened for breaking the circuit between the battery and the sounding means.

Referring in detail to the head bracket 16, this bracket is preferably a casting and includes a downwardly facing recess 26 extending transversely across the bracket for receiving the rim 12 of the tank and supporting the device on the latter. The bracket includes an outer end 28 and an inner end 30 relative to its position on the tank, the outer end having a vertical planar face 32 extending transversely across the bracket. The sounding means 18 is secured to this face by suitable means such as screws 34. The sounding means 18, shown diagrammatically, may be of any suitable form such as a buzzer or similar electrically operated device. The details of such buzzer need not be entered into herein. While an audible signal means is preferred, it will be understood that other types may be used, such as a visual means.

The head bracket 30 includes a bore 36 leading from the planar face 32 and terminating in a second bore 38 which opens into a socket 40 formed in the inner end 30 of the bracket and opening downwardly. Disposed in the bore 36 is an electric conductor such as a conventional insulated wire having electrical connection with the buzzer 18 and leading to and connected with a contact element 42 which is mounted in the bore 38 and exposed in the socket 40. The contact element 42 may be of any suitable kind and is insulated from the material of the bracket by means of a bushing 44 of suitable insulating material. Preferably the contact element 42 is in the form of a rivet and has a head having a peripheral portion similarly insulated from the bracket proper 16 by a flange portion on the insulating bushing. The contact element 42 is disposed centrally of the socket 34 for engagement by the terminal 46 of the adjacent cell of the battery 22, in a known manner as in a flashlight.

The housing 20 includes two main parts, namely an upper portion 48 and a lower portion 50 detachably secured together. The upper portion 48 is preferably cylindrical and is threadedly secured in the flange 52 surrounding the socket 40. A liner 54 of suitable insulating material is disposed in the tubular member 48, serving to insulate the battery from the housing member 48. A suitable sealing gasket 56 is interposed between the upper end of the housing member 48 and the end wall of the socket 40.

The cells of the battery 22 are maintained in proper position, with the terminal 46 in contact engagement with the contact element 42, by means of a spring 58 of suitable and well known type, which is of conducting material and engages the bottom end or terminal 60 of the battery and a contact element 62 which may be in the form of a headed rivet. This rivet serves as a contact element for engagement by another contact element 64 in the float 24. The contact element 64 is mounted in and supported by a partition or disc 66 interposed between the housing members 48 and 50. These two housing members are detachably secured together as by threaded engagement, and shouldered surfaces are provided for gripping the partition or disc therebetween, together with other elements mentioned below. A bushing 68 surrounds the rivet and insulates it from the partition 66 as well as another disc 70 interposed between the two housing parts. The contact spring 58 has supporting engagement with the rivet 62 as indicated at 72 and has electrical contact engagement also at that point for completing the circuit between the battery and the contact element 62. A gasket 74 of sealing material is interposed between the partition 66 and the lower end of the upper housing member 48 for sealing the interior of the housing member 48 against the entrance of water thereinto. The gaskets 56 and 74 thus seal the compartment formed in the housing member 48 against liquid entering and short circuiting the battery 22.

The disc 70 serves to complete circuit between the contact element 62 and the return or ground element to the buzzer, and hence is of conducting material. This disc is provided with one or more ears 76 at each of two diametrically opposed locations to which are secured, as by soldering, the end of a flexible conductor or wire 78 which is also electrically engaged with the contact element 64. The latter may be in the form of a brad having a shank penetrating into the float 24 and a head part to which the wire or conductor 78 is electrically engaged.

The head bracket 16 and the two housing members 48 and 50 are of electrically conducting material and serve as a ground or return circuit portion between the battery 22 and the buzzer 18. The buzzer is grounded to the head bracket 16, and at the opposite end of the circuit the disc 70 has engagement with the housing member 50, the latter having engagement with the housing member 48 which in turn engages the head bracket 16. Upon movement of the float 24 in rising and lowering movements the contact element 64 is brought into and out of contact engagement with the contact element 62, making and breaking the circuit between the battery and the buzzer.

The float 24 may be of any suitable material, such as cork, or other like material. The lower housing member 50 has an open bottom or lower end 80 for the free flow of liquid thereinto and side vent apertures 82 adjacent the upper portion of the housing member. An O-ring 84 is preferably provided adjacent the lower end of the housing, such as in a groove formed in the lower housing member 50 for engaging the wall of the tank 10 when the device is applied to the tank to provide a cushioning effect.

In the use of the device, the attendant when the hydratherapy tank and other equipment are to be used, grasps the device and sets it on the tank merely by inserting the housing 20 into the tank and resting the bracket on the rim of the tank, with the latter received in the recess 26. The weight of the housing 20 and contents thereof tends to pivot the device about the rim, and the O-ring 84 at the lower end of the housing engages the wall of the tank. When the water rises in the tank to a level just below the desired water level indicated at 86, the float begins to rise and when it reaches the level indicated at the line 86, the float is fully lifted and the contact element 64 engages the contact element 62. The circuit is thus completed to the alarm device or buzzer 18 and the attendant is reminded that the desired level is reached, whereupon he shuts off the supply of water. He then grasps the alarm device and merely lifts it from the tank, whereupon the float 24 drops and breaks the circuit to the alarm element or buzzer.

The device is of extremely simple construction and may be utilized without in any way modifying the tank for the purpose. The device is small and compact and has a rigid exterior with all moving parts entirely enclosed therein. The switch means, constituted by the contact elements 62 and 64 is of simple construction, one of the contact elements being mounted directly on and carried by the float 24 so that when the float falls the switch means is opened, resulting in a positive action. It is practically impossible for any of the working or moving parts of the device to become disrupted due to careless handling since they are all enclosed. The attendant need only hook the device on the rim of the tank to put it in use, or to hook it on a supporting element when it is not in use.

While I have disclosed herein a certain preferred embodiment of the invention, it will be understood that changes may be made within the scope of the appended claim.

Having thus described the invention what I claim as new and desire to secure by Letters Patent is:

An alarm device comprising a head bracket adapted to be quickly and removably suspended from the rim of a tank, said head bracket being generally of U-shape in longitudinal cross section and having an inner end adapted to depend into the interior of the tank below said rim, an outer end adapted to depend below said rim exteriorly of the tank, and an intermediate connecting portion adapted to rest loosely on said rim, buzzer means mounted on the outer end of the bracket, the inner end of the bracket having a downwardly facing socket, a housing detachably threadedly received in said socket and depending into the tank, said housing including an upper tubular member and a lower tubular member detachably secured together, a partition interposed between the housing members establishing a sealed compartment in the upper member, a battery in said compartment, a contact element in said partition exposed in the lower housing member, a vertically slidable float in the lower housing member, the lower housing member having openings above and below said float respectively for subjecting the float to liquid in the tank, a contact carried by the float and movable into and out of engagement with the first contact element in response to movements of the float, and circuit means interconnecting the battery and buzzer means including and controlled by said contact elements.

References Cited in the file of this patent
UNITED STATES PATENTS

| 1,066,479 | Fiala | July 8, 1913 |
| 1,421,717 | Renda | July 4, 1922 |
| 2,602,846 | Polkoff | July 8, 1952 |